US010168669B2

(12) United States Patent
Knappe et al.

(10) Patent No.: US 10,168,669 B2
(45) Date of Patent: Jan. 1, 2019

(54) TIMELINE USER INTERFACE

(71) Applicant: Suunto Oy, Vantaa (FI)

(72) Inventors: Niko Knappe, Vantaa (FI); Michael Miettinen, Vantaa (FI)

(73) Assignee: Amer Sports Digital Services Oy, Vantaa (FI)

( * ) Notice: Subject to any disclaimer, the term of this patent is extended or adjusted under 35 U.S.C. 154(b) by 0 days.

(21) Appl. No.: 15/229,146

(22) Filed: Aug. 5, 2016

(65) Prior Publication Data

US 2017/0038740 A1 Feb. 9, 2017

(30) Foreign Application Priority Data

Aug. 5, 2015 (FI) ...................................... 20155573
Aug. 14, 2015 (GB) .................................. 1514449.6

(51) Int. Cl.
*G06F 3/00* (2006.01)
*G04G 9/00* (2006.01)
*G04G 21/04* (2013.01)

(52) U.S. Cl.
CPC ........... *G04G 9/0076* (2013.01); *G04G 21/04* (2013.01)

(58) Field of Classification Search
CPC ......................... G06Q 10/109; G06Q 10/1093
See application file for complete search history.

(56) References Cited

U.S. PATENT DOCUMENTS

2003/0038831 A1* 2/2003 Engelfriet ........... G06F 15/0266 715/719
2006/0068812 A1* 3/2006 Carro ................ H04M 1/72566 455/456.3
2008/0294663 A1* 11/2008 Heinley ................ G06F 3/0481
2009/0094557 A1* 4/2009 Howard ............ G06F 17/30241 715/848
2009/0265623 A1* 10/2009 Kho ..................... G06Q 10/109 715/273
2010/0167712 A1 7/2010 Stallings et al.
2010/0257014 A1* 10/2010 Roberts ................ G06F 3/0488 705/7.19

(Continued)

FOREIGN PATENT DOCUMENTS

AU 2007216704 A1 4/2008
WO WO 02054157 A1 7/2002

(Continued)

*Primary Examiner* — Linh K Pham
(74) *Attorney, Agent, or Firm* — Seppo Laine Oy

(57) ABSTRACT

According to an example aspect of the present invention, there is provided an apparatus comprising at least one processing core, at least one memory including computer program code, the at least one memory and the computer program code being configured to, with the at least one processing core, cause the apparatus at least to obtain at least one of a sunrise time and a sunset time for a current location of the apparatus; obtain a plurality of calendar events from a calendar application; display a time axis on a screen, and display, relative to the time axis, a plurality of symbols corresponding to at least part of the plurality of calendar events, and display, relative to the time axis, at least one of: an indication of sunrise corresponding to the sunrise time, and an indication of sunset corresponding to the sunset time.

20 Claims, 6 Drawing Sheets

(56) References Cited

U.S. PATENT DOCUMENTS

| | | | | |
|---|---|---|---|---|
| 2011/0252351 | A1* | 10/2011 | Sikora | G06Q 10/109<br>715/769 |
| 2011/0283224 | A1* | 11/2011 | Ramsey | G06F 3/04855<br>715/781 |
| 2011/0296312 | A1* | 12/2011 | Boyer | G06F 3/0488<br>715/736 |
| 2014/0365107 | A1* | 12/2014 | Dutta | G01C 21/343<br>701/408 |
| 2015/0347983 | A1* | 12/2015 | Jon | G06Q 10/1095<br>705/7.19 |
| 2016/0034133 | A1* | 2/2016 | Wilson | G06F 3/0488<br>715/772 |
| 2016/0327915 | A1* | 11/2016 | Katzer | G04B 19/04 |
| 2017/0032256 | A1* | 2/2017 | Otto | G06N 5/04 |
| 2017/0124517 | A1* | 5/2017 | Martin | G06Q 10/109 |

FOREIGN PATENT DOCUMENTS

| | | | |
|---|---|---|---|
| WO | WO 2014182162 | A3 | 6/2015 |
| WO | WO 2016022203 | A1 | 2/2016 |

* cited by examiner

TIMELINE USER INTERFACE

FIELD

The present invention relates to the field of user interfaces.

BACKGROUND

A user interface, UI, enables a user to interact with a device, such as, for example, a car, a smartphone, an automated banking device or an aircraft control system. Different user interfaces are appropriate for different purposes, for example, where the user uses the device to perform actions that set persons at risk, the quality and quantity of information presented to the user when interacting with the user interface must be sufficient to enable use of the device safely.

User interfaces may be based on presenting information to the user, and receiving inputs from the user. Information may be presented using an output device such as a display, for example an organic light-emitting diode, OLED, display. Inputs may be received from the user via various input devices, such as touchscreen displays, push buttons, microphones arranged to capture the user's speech and/or levers the user can pull.

A traditional user interface of a wristwatch comprises a long and a short arm, which rotate over a watch dial to indicate the time of day. Digital wrist watches may comprise, for example, a liquid crystal display, LCD, type display indicating the time of day numerically.

A smart watch may comprise a touchscreen, such that the display portion of the touchscreen acts as an output device of the user interface and the touch sensitive portion of the touchscreen acts as an input device of the user interface. Using a smart watch presents challenges, since useful applications tend to require larger screens to present a useful quantity of information using a font large enough, that users can read it without magnifying devices.

Calendar applications facilitate planning of meetings, travel and resources. Typically, a user accesses a calendar application using a personal computer with a large screen, for example via a Linux or Windows operating system. The user may then see, for example, an entire work week at a glance.

SUMMARY OF THE INVENTION

The invention relates in general to a user interface for presenting sunrise and sunset time in a new way.

The invention is defined by the features of the independent claims. Some specific embodiments are defined in the dependent claims. According to a first aspect of the present invention, there is provided an apparatus comprising at least one processing core, at least one memory including computer program code, the at least one memory and the computer program code being configured to, with the at least one processing core, cause the apparatus at least to obtain at least one of a sunrise time and a sunset time for a current location of the apparatus; obtain a plurality of calendar events from a calendar application; display a time axis on a screen, and display, relative to the time axis, a plurality of symbols corresponding to at least part of the plurality of calendar events, and display, relative to the time axis, at least one of: an indication of sunrise corresponding to the sunrise time, and an indication of sunset corresponding to the sunset time.

According to a second aspect of the present invention, there is provided an apparatus wherein the at least one memory and the computer program code are configured to, with the at least one processing core, cause the apparatus to display the indication of sunrise in connection with a part of the time axis corresponding to the sunrise time and/or display the indication of sunset in connection with a part of the time axis corresponding to the sunset time.

According to a third aspect of the present invention, there is provided an apparatus wherein at least one of the sunrise time is a time of day when the sun rises in the current location of the apparatus, and the sunset time is a time of day when the sun sets in the current location of the apparatus.

According to a fourth aspect of the present invention, there is provided an apparatus wherein the at least one memory and the computer program code are configured to, with the at least one processing core, cause the apparatus to obtain the at least one of the sunrise time and the sunset time, at least in part, by obtaining the current location of the apparatus from a satellite positioning receiver comprised in the apparatus.

According to a fifth aspect of the present invention, there is provided an apparatus wherein the at least one memory and the computer program code are configured to, with the at least one processing core, cause the apparatus to enable a user to scroll the time axis forward and backward.

According to a sixth aspect of the present invention, there is provided an apparatus wherein the at least one memory and the computer program code are configured to, with the at least one processing core, cause the apparatus to enable user interaction with the plurality of symbols, to thereby activate features associated with the corresponding calendar events.

According to a seventh aspect of the present invention, there is provided an apparatus wherein the at least one memory and the computer program code are configured to, with the at least one processing core, cause the apparatus to display a symbol in connection with a part of the time axis corresponding to a time when a user needs to start toward a predefined location so as to arrive at the predefined location before sunset and/or adverse weather.

According to an eighth aspect of the present invention, there is provided an apparatus wherein the at least one memory and the computer program code are configured to, with the at least one processing core, cause the apparatus to determine a context of the apparatus, to select a subset of the plurality of calendar events based on the context of the apparatus, and to not display symbols corresponding to calendar events that are not comprised in the selected subset.

According to a ninth aspect of the present invention, there is provided an apparatus wherein the at least one memory and the computer program code are configured to, with the at least one processing core, cause the apparatus to predict, based at least in part on the calendar application, a need for a rich media interface and to trigger startup of a higher capability processing device in the apparatus at a time that is selected based on the prediction.

According to a tenth aspect of the present invention, there is provided an apparatus wherein the at least one memory and the computer program code are configured to, with the at least one processing core, cause the apparatus to display at least part of an arc, and wherein a first intersection of the arc with the time axis is the indication of sunrise and wherein a second intersection of the arc with the time axis is the indication of sunset.

According to an eleventh aspect of the present invention, there is provided an apparatus wherein the apparatus comprises a smart watch.

According to a twelfth aspect of the present invention, there is provided an apparatus, wherein the apparatus comprises a handheld communications device.

According to a thirteenth aspect of the present invention, there is provided an apparatus wherein the apparatus comprises a personal fitness tracker.

According to a fourteenth aspect of the present invention, there is provided an apparatus wherein the apparatus comprises an at least partially retractable, rotatable hardware element, and the apparatus is configured to be operable by a user by interacting with the rotatable hardware element.

According to a fifteenth aspect of the present invention, there is provided a method comprising obtaining at least one of a sunrise time and a sunset time for a current location of an apparatus, obtaining a plurality of calendar events from a calendar application, displaying a time axis on a screen, and displaying, relative to the time axis, a plurality of symbols corresponding to at least part of the plurality of calendar events, and displaying, relative to the time axis, at least one of an indication of sunrise corresponding to the sunrise time, and an indication of sunset corresponding to the sunset time.

According to a sixteenth aspect of the present invention, there is provided a method further comprising displaying the indication of sunrise in connection with a part of the time axis corresponding to the sunrise time and/or displaying the indication of sunset in connection with a part of the time axis corresponding to the sunset time.

According to a seventeenth aspect of the present invention, there is provided a method wherein at least one of the sunrise time is a time of day when the sun rises in the current location of the apparatus, and the sunset time is a time of day when the sun sets in the current location of the apparatus.

According to an eighteenth aspect of the present invention, there is provided a method wherein the at least one of the sunrise time and the sunset time is obtained, at least in part, by obtaining the current location of the apparatus from a satellite positioning receiver comprised in the apparatus.

According to a nineteenth aspect of the present invention, there is provided a method further comprising causing the apparatus to enable a user to scroll the time axis forward and backward.

According to a twentieth aspect of the present invention, there is provided a method further comprising causing the apparatus to enable user interaction with the plurality of symbols, to thereby activate features associated with the corresponding calendar events.

According to a twenty-first aspect of the present invention, there is provided a method further comprising causing the apparatus to display a symbol in connection with a part of the time axis corresponding to a time when a user needs to start toward a predefined location so as to arrive at the predefined location before sunset and/or adverse weather.

According to a twenty-second aspect of the present invention, there is provided a method further comprising causing the apparatus to determine a context of the apparatus, to select a subset of the plurality of calendar events based on the context of the apparatus, and to not display symbols corresponding to calendar events that are not comprised in the selected subset.

According to a twenty-third aspect of the present invention, there is provided a method further comprising causing the apparatus to predict, based at least in part on the calendar application, a need for a rich media interface and to trigger startup of a higher capability processing device in the apparatus at a time that is selected based on the prediction.

According to a twenty-fourth aspect of the present invention, there is provided a method comprising causing the apparatus to display at least part of an arc, and wherein a first intersection of the arc with the time axis is the indication of sunrise and wherein a second intersection of the arc with the time axis is the indication of sunset.

According to a twenty-fifth aspect of the present invention, there is provided an apparatus including means for obtaining at least one of a sunrise time and a sunset time for a current location of an apparatus, means for obtaining a plurality of calendar events from a calendar application, means for displaying a time axis on a screen, and for displaying, relative to the time axis, a plurality of symbols corresponding to at least part of the plurality of calendar events, and means for displaying, relative to the time axis, at least one of an indication of sunrise corresponding to the sunrise time, and an indication of sunset corresponding to the sunset time.

According to a twenty-sixth aspect of the present invention, there is provided a non-transitory computer readable medium having stored thereon a set of computer readable instructions that, when executed by at least one processor, cause an apparatus to at least obtain at least one of a sunrise time and a sunset time for a current location of the apparatus, obtain a plurality of calendar events from a calendar application, display a time axis on a screen, and display, relative to the time axis, a plurality of symbols corresponding to at least part of the plurality of calendar events, and display, relative to the time axis, at least one of an indication of sunrise corresponding to the sunrise time, and an indication of sunset corresponding to the sunset time.

According to a twenty-seventh aspect of the present invention, there is provided a computer program configured to cause a method in accordance with at least one of the inventive methods to be performed.

EMBODIMENTS

Figure 1A:
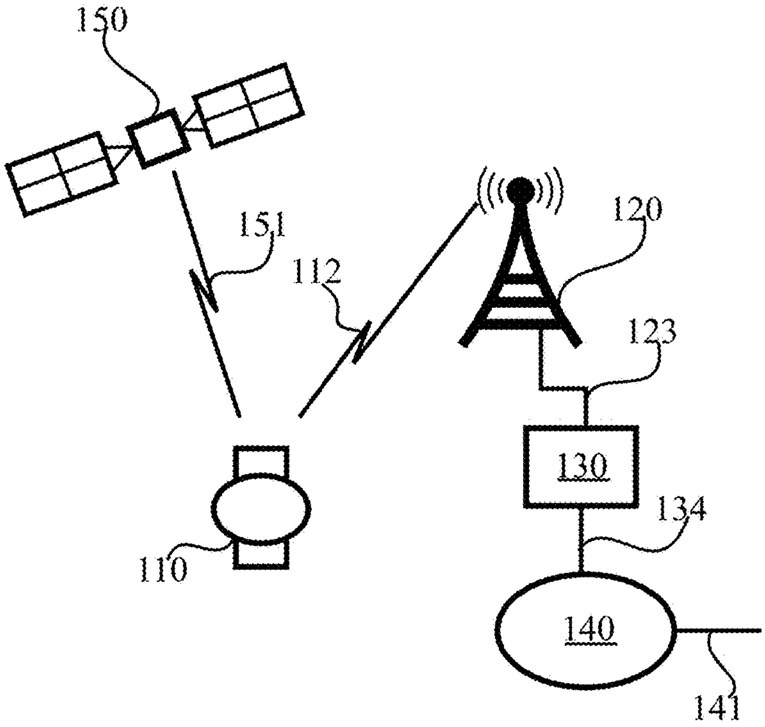
FIG. 1A illustrates a system in accordance with at least some embodiments of the present invention.

By presenting information along a time axis, a device can allow a user to glean locally and temporally relevant information from a limited-size screen. In detail, a user can scroll along the time axis to see past and/or future events, which may originate in a calendar application or the natural world surrounding him. Combining an indication of a sunset or sunrise to the time axis enables the user to plan his activities with regard to available natural light. The time axis provides a conceptually efficient classification method that enables presenting on the limited-size screen only the information the user is presently interested in.

FIG. 1 illustrates a system in accordance with at least some embodiments of the present invention. The system comprises device 110, which may comprise, for example, a smart watch, digital watch, smartphone, phablet device, tablet device, or another type of suitable device. Device 110 comprises a display, which may comprise a touchscreen display, for example. The display may be limited in size. Device 110 may be powered, for example, by a rechargeable battery. An example of a limited-size display is a display worn on a wrist.

Device 110 may be communicatively coupled with a communications network. For example, in FIG. 1 device 110 is coupled, via wireless link 112, with base station 120. Base station 120 may comprise a cellular or non-cellular base station, wherein a non-cellular base station may be referred to as an access point. Examples of cellular technologies include wideband code division multiple access, WCDMA, and long term evolution, LTE, while examples of non-cellular technologies include wireless local area network, WLAN, and worldwide interoperability for microwave access, WiMAX. Base station 120 may be coupled with network node 130 via connection 123. Connection 123 may be a wire-line connection, for example. Network node 130 may comprise, for example, a controller or gateway device. Network node 130 may interface, via connection 134, with network 140, which may comprise, for example, the Internet or a corporate network. Network 140 may be coupled with further networks via connection 141. In some embodiments, device 110 is not configured to couple with base station 120.

Device 110 may be configured to receive, from satellite constellation 150, satellite positioning information via satellite link 151. The satellite constellation may comprise, for example the global positioning system, GPS, or Galileo constellation. Satellite constellation 150 may comprise more than one satellite, although only one satellite is illustrated in FIG. 1 for the same of clarity. Likewise, receiving the positioning information over satellite link 151 may comprise receiving data from more than one satellite.

In embodiments where device 110 is not enabled to receive data from a satellite constellation, device 110 may obtain positioning information by interacting with a network in which base station 120 is comprised. For example, cellular networks may employ various ways to position a device, such as trilateration, multilateration or positioning based on an identity of a base station with which attachment is possible. Likewise a non-cellular base station, or access point, may know its own location and provide it to device 110, enabling device 110 to position itself within communication range of this access point.

Device 110 may be configured to obtain a current time from satellite constellation 150, base station 120 or by requesting it from a user, for example. Once device 110 has the current time and an estimate of its location, device 110 may consult a look-up table, for example, to determine how much time is remaining to sunset, and/or sunrise.

Device 110 may be configured to determine the sunset time and/or sunrise time, and to obtain event information from a calendar application. Device 110 may further be configured to present to the user a representation of at least some of these events, arranged relative to a time axis to enable the user to understand how calendar events relate to each other and to sunset and/or sunrise. This way, the user can proceed to complete tasks during daylight hours, for example. Using the time axis, or timeline, enables presenting the relevant information to the user from a limited-size screen in a time-ordered way.

Figure 1B:
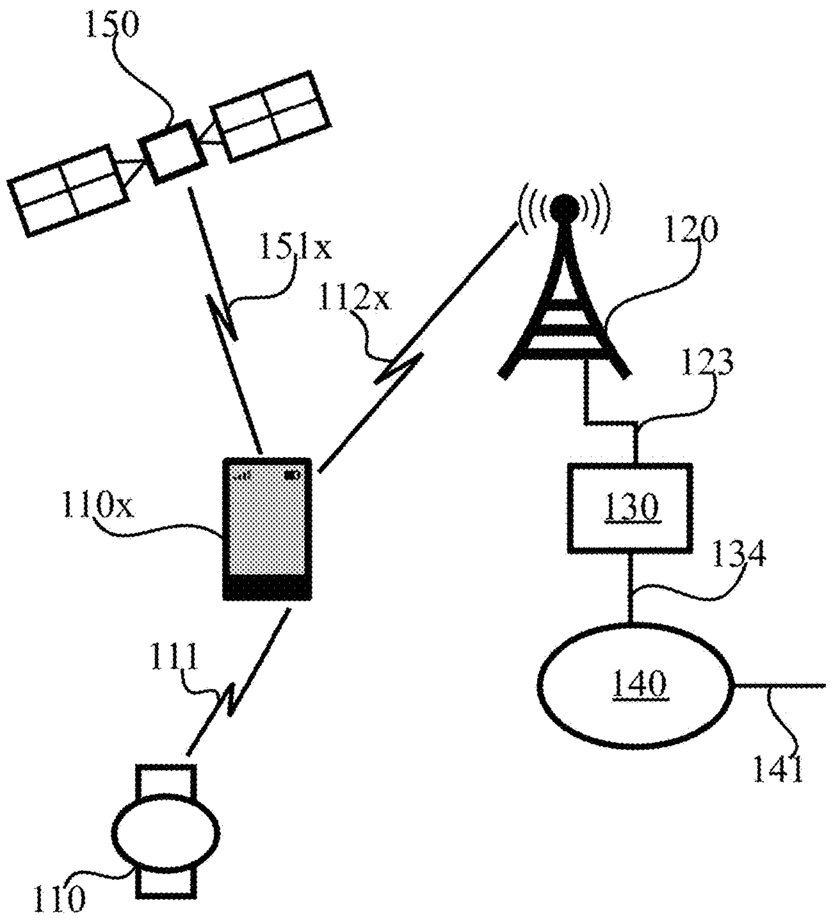
FIG. 1B illustrates a system in accordance with at least some embodiments of the present invention.

FIG. 1B illustrates a system in accordance with at least some embodiments of the present invention. Like numbering denotes like structure as in FIG. 1A. FIG. 1B embodiments comprise an auxiliary device 110*x*.

Device 110 may be communicatively coupled, for example communicatively paired, with an auxiliary device 110*x*. The communicative coupling, or pairing, is illustrated in FIG. 1 as interface 111, which may be wireless, as illustrated, or wire-line, depending on the embodiment. Auxiliary device 110*x* may comprise a smartphone, tablet computer or other computing device, for example. Auxiliary device 110*x* may comprise a device that the owner of device 110 uses to consume media, communicate or interact with applications. Auxiliary device 110*x* may be furnished with a larger display screen than device 110, which may make auxiliary device 110*x* preferable to the user when a complex interaction with an application is needed, as a larger screen enables a more detailed rendering of interaction options. In some embodiments, such as those illustrated in FIG. 1A, auxiliary device 110*x* is absent.

In some embodiments, where auxiliary device 100*x* is present, device 110 is configured to use connectivity capability of auxiliary device 110*x*. For example, device 110 may access a network via auxiliary device 110*x*. In these embodiments, device 110 need not be furnished with connectivity toward base station 120, for example, since device 110 may access network resources via interface 111 and a connection auxiliary device 110*x* has with base station 120. Such a connection is illustrated in FIG. 1B as connection 112*x*. For example, device 110 may comprise a smart watch and auxiliary device 110*x* may comprise a smartphone, which may have connectivity to cellular and/or non-cellular data networks. Likewise, in some embodiments device 110 may receive satellite positioning information, or positioning information derived therefrom, via auxiliary device 110*x* where device 110 lacks a satellite positioning receiver of its own. A satellite connection of auxiliary device 151*x* is illustrated in FIG. 1B as connection 151X.

In some embodiments, device 110 may have some connectivity and be configured to use both that and connectivity provided by auxiliary device 110*x*. For example, device 110 may comprise a satellite receiver enabling device 110 to obtain satellite positioning information directly from satellite constellation 150. Device 110 may then obtain network connectivity to base station 120 via auxiliary device 110*x*.

Figure 2:
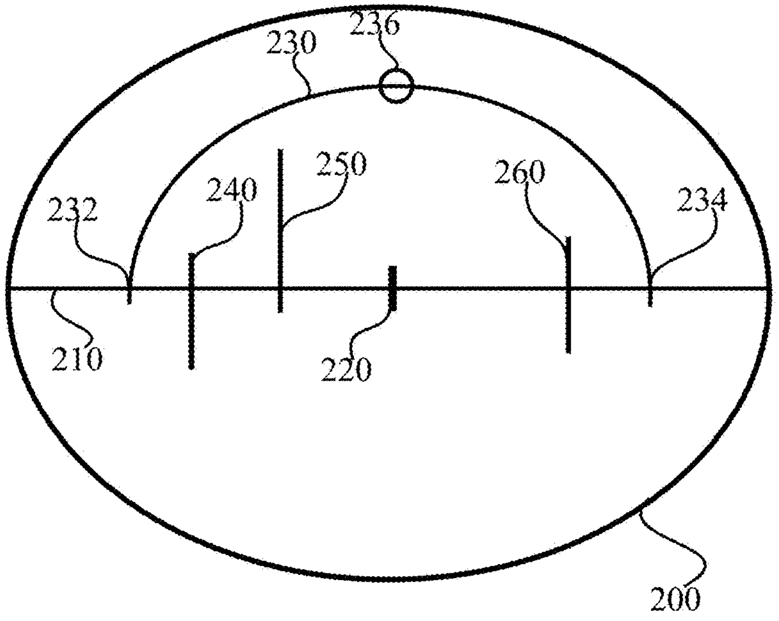
FIG. 2 illustrates a user interface in accordance with at least some embodiments of the present invention.

FIG. 2 illustrates a user interface in accordance with at least some embodiments of the present invention. Display 200 may comprise a display that is comprised in device 110 of FIG. 1, for example. On display 200 is displayed a time axis 210, which may be referred to as a timeline. In the middle of the timeline is a current time indicator 220. Current time indicator 220 is optional. The shape of display 200 need not be the same shape as that illustrated in FIG. 2.

Events are represented along the timeline by symbols 240, 250 and 260. Each of symbols 240, 250 and 260 corresponds to a calendar event or a dynamic event, such that the time when the event occurs determines the place on, or relative to, the timeline where the corresponding symbol is displayed. For example, in FIG. 2, the events denoted by symbols 240 and 250 have already taken place, and the event corresponding to symbol 260 will take place in the future. The user interface may communicate with a calendar application, to obtain therefrom information characterizing the calendar events to enable their representation along the timeline as symbols. Naturally, the number of events need not be three as illustrated in FIG. 2, but the number of events is dependent on dynamic and calendar input.

Represented along the time axis 210 is the sunrise time 232 and the sunset time 234. In various embodiments, either the sunrise time or the sunset time may be omitted from the user interface. Optionally, an arc 230 may be illustrated, representing the route of the Sun in the sky. The position of the Sun 236 may be represented along the arc. Alternatively or additionally, a position or phase of the Sun may be represented close to time indicator 220, or in another suitable way. Device 110 may determine the sunrise time and sunset time based on the positioning information and a table stored in a memory that device 110 may access, for example.

Device 110, running the user interface illustrated in FIG. 2, may be configured to enable a user to scroll along the timeline, for example by providing a swiping interaction to a touchscreen used to display the user interface. Likewise, the user may be enabled to zoom in and/or out, for example by providing a pinching interaction to a touchscreen used to display the user interface. Another possibility to scroll and/or zoom the user interface is a rotatable hardware element provided in device 110. For example, a rotatable hardware element may be partially retractable, such that when the hardware element is unretracted, rotating it provides a scrolling interaction with the user interface, and when retracted, rotating it provides a zooming interaction with the user interface. This kind of interaction may be suitable to small screen sizes, where the user's fingers may be of a similar size to the screen. An example rotatable hardware element has been described in the U.S. patent application Ser. No. 12/650,303, published as US2010/0187074.

Device 110 may be configured to determine at least one dynamic event. A dynamic event comprises an event that occurs at a time which depends on the location of device 110. A dynamic event may occur at a time which depends on the location of device 110 together with a location of a predefined location. The predefined location may comprise, for example, a point of interest. The predefined location may be defined by the user. The predefined location may comprise, for example, the user's home, a base camp, a hotel, a hospital or another kind of location. For example, device 110 may determine a time, when the user needs to start walking, cycling or driving toward the predefined location, such that the user will arrive in the predefined location before sunset. To enable device 110 to determine this time, device 110 may know, from the positioning information and, for example, a look-up table stored in device 110, the sunset time. Device 110 may then determine a route from the current position of device 110 to the predefined location, and determine the length of the route. Device 110 may determine the route based, at least in part, on an interaction with a mapping application. The time needed to traverse the route, the traverse time, can then be determined based on a movement speed of the user, which device 110 may be pre-configured with, or which device 110 may determine from past behaviour of the user. The time of the dynamic event may then be determined as preceding the sunset time by the traverse time.

Alternatively to sunset, the dynamic event may be determined based on a meteorological event, for example rain. To enable this, device 110 may obtain a locally relevant weather forecast and use it instead of the sunset time, to deduce when the user needs to start toward the predefined location. As a further example, a dynamic event may be based on a time of departure of a public transport, such as a train or aircraft, for example. Thus the user may be provided with a visual indication of how long he has before he needs to start toward a train station or airport.

Device 110 may be configured to sound an alarm, or cause a vibrating or other kind of indication to be provided to a user, for example, triggered by a dynamic event. Thus safety of persons roaming in nature may be enhanced, as they are warned to start toward the predefined location in time to get there before dark, rain, or another event.

While FIG. 2 illustrates a view into the user interface where the sunrise and sunset are both visible, a zoomed and/or scrolled view may display only one of these, or indeed neither in case the view is zoomed to a section of the timeline that falls between sunrise and sunset. In general, an indication as to a position or phase of the sun may be provided, to enable a user to know how long it will be until sunset or sunrise. Such an indication may take the form of the arc 230, an angle or tangent or another kind of suitable indication.

The user may select a symbol, such as symbol 250, and interact with it to cause device 110 to perform an action that relates to the calendar event that corresponds to symbol 250. For example, device 110 may cause details, such as location, attendees or duration, of the calendar event to be displayed onscreen as a response to the user touching symbol 250, or indeed another symbol. The details may be displayed below the timeline in the timeline view, or alternatively the timeline view may be replaced with the details, for example for five or ten seconds. In some embodiments, the user is enabled to interact with an application that relates to the calendar event. For example, the user may participate in a conference call by interacting with symbol 250, and then with a further user interface element that is displayed, for example along with the details, as a response to the user touching symbol 250.

When the user interacts with a symbol corresponding to a dynamic event, the user may be presented with information concerning the dynamic event, such as, for example, a map with the determined route displayed, or instructions concerning how to get to the predefined location.

Device 110 may be configured to detect a device context. For example, device 110 may detect that the user is at work, or interacting with work programs, responsive to which device 110 may cause work-related calendar events to be represented in the timeline user interface. For example, in case the user is at work, non-work related calendar events may be suppressed, by which it is meant that symbols corresponding to them are not displayed in the user interface. As another example, when the user is moving around downtown, dynamic events that relate to public transport may be represented in the user interface. As a yet further example, when the user is roaming in nature, dynamic events relating to sunset or rain may be represented, and work-related events suppressed. In general, in-context events may be represented in the user interface, while out-of-context events may be suppressed and not represented graphically in the user interface.

Device 110 may be configured to detect the device context autonomously, and to suppress the out-of-context dynamic events and/or calendar events without user input. The user may, using a user interface interaction element, override the suppressing to view all calendar and/or dynamic events on the timeline, or to re-configure to device context in case device 110 has detected the device context incorrectly. An advantage of such suppressing is that in a limited-size screen device, the screen is used to display more relevant information, and less relevant information, which would clutter the view, is not displayed.

Device 110 may be configured to provide a display in at least two modes, a reduced media mode and a rich media mode. The reduced media mode may be renderable by a low-capacity processing device in device 110, while the rich media mode may require device 110 to activate a high-capacity processing device in device 110. The high-capacity processing device may consume more battery resources than the low-capacity processing device. Device 110 may be configured to predictively activate the high-capacity processing device as a response to a determination that a calendar event the handling of which will require the rich media mode will soon occur.

Figure 3:
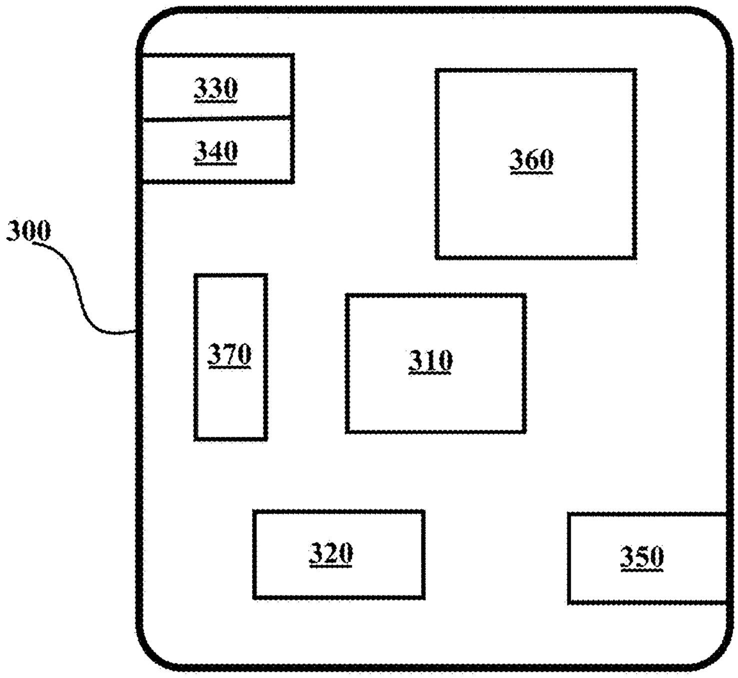
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, an embedded device 110 of FIG. 1. Comprised in device 300 is processor 310, which may comprise, for example, a single- or multi-core processor wherein a single-core processor comprises one processing core and a multi-core processor comprises more than one processing core. Processor 310 may comprise more than one processor or processing unit. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to interact with a time axis based view.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
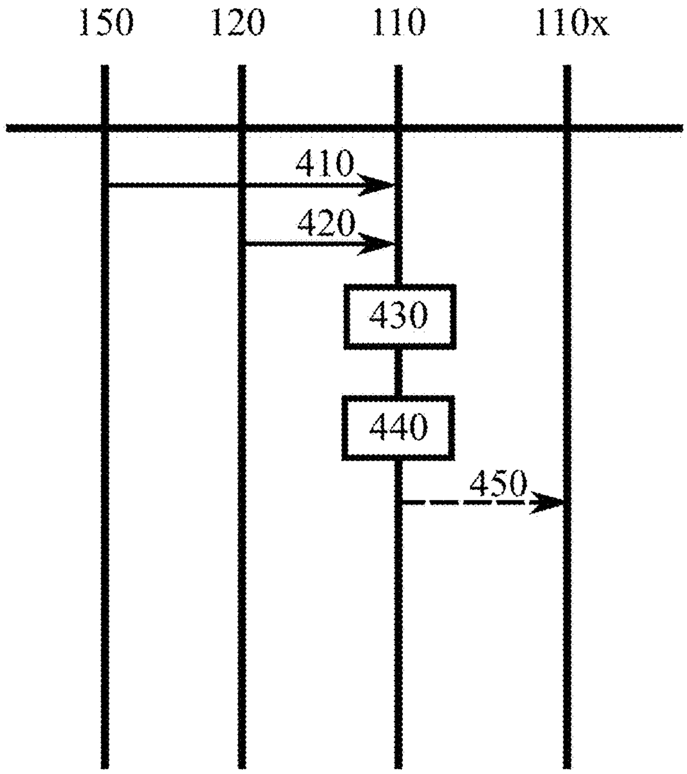
FIG. 4 illustrates signalling in accordance with at least some embodiments of the present invention.

FIG. 4 illustrates signalling in accordance with at least some embodiments of the present invention. Disposed on the vertical axes are, from left to right, satellite constellation 150, base station 120, device 110 and auxiliary device **110*x*. Satellite constellation 150, base station 120 and device 110 correspond to like elements described in connection with FIG. 1. Auxiliary device 110*x* may comprise a user device that is furnished with a larger screen than device 110, for example. For example, auxiliary device 110*x* may comprise a smartphone or tablet computer. Auxiliary device 110*x* may be paired with device 110**, for example using the Bluetooth protocol.

In phase 410, device 110 obtains positioning information from satellite constellation 150. Device 110 may use the positioning information to determine where it is, and to determine a sunrise time and sunset time for the determined location.

In phase 420, device 110 obtains meteorological information from base station 120. For example, device 110 may request and responsively receive the meteorological information relevant to the determined location of device 110, for example, from a server that device 110 can reach via base station 120.

In phase 430, device 110 may determine the time of a dynamic event, based, for example, on the sunset time and/or the meteorological information, as described above. The dynamic event may correspond to a time when a user needs to start toward a predefined location, for example, to avoid darkness and/or adverse weather.

In phase 440, device 110 may provide an alert to the user, for example via a user interface, vibrator and/or speaker. In optional phase 450, the alert may be provided to the user via auxiliary device 110*x*.

Figure 5:
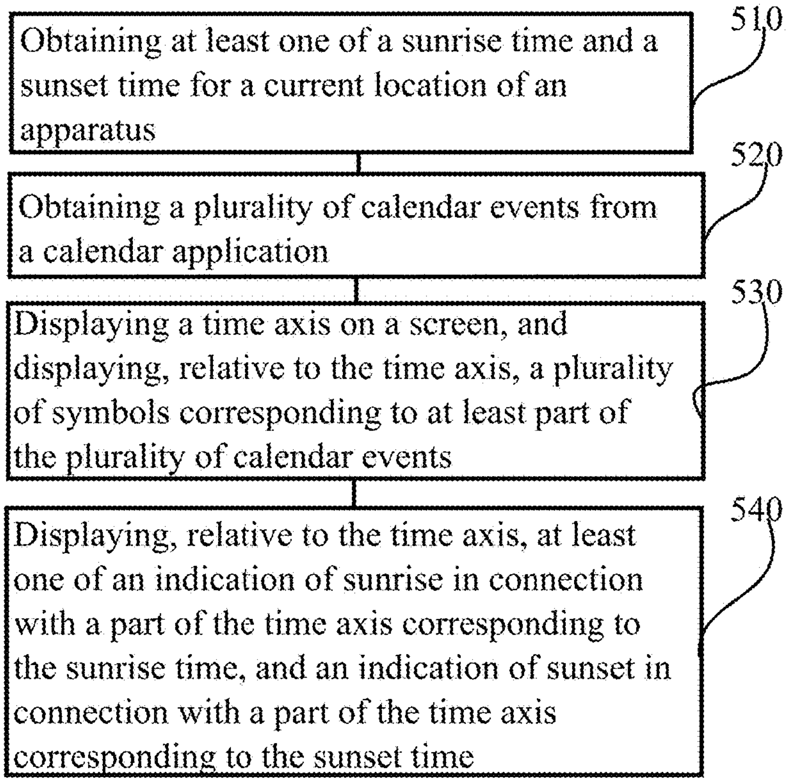
FIG. 5 is a flow graph of a method in accordance with at least some embodiments of the present invention.

FIG. 5 is a flow graph of a method in accordance with at least some embodiments of the present invention. The phases of the illustrated method may be performed in device 110, for example, or in a control device that is configured to control the functioning of device 110, when implanted therein.

Phase 510 comprises obtaining at least one of a sunrise time and a sunset time for a current location of an apparatus. Phase 520 comprises obtaining a plurality of calendar events from a calendar application. Phase 530 comprises displaying a time axis on a screen, and displaying, relative to the time axis, a plurality of symbols corresponding to at least part of the plurality of calendar events. Finally, phase 540 comprises displaying, relative to the time axis, at least one of an indication of sunrise in connection with a part of the time axis corresponding to the sunrise time, and an indication of sunset in connection with a part of the time axis corresponding to the sunset time.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in providing an efficient man-machine interface and secure roaming in nature.

Acronyms List

OLED Organic light-emitting diode
GPS Global positioning system
LTE Long term evolution
UI User interface
WCDMA Wideband code division multiple access
WiMAX Worldwide interoperability for microwave access
WLAN Wireless local area network

REFERENCE SIGNS LIST

| | |
|---|---|
| 110 | Device |
| 110x | Auxiliary device |
| 120 | Base station |
| 130 | Network node |
| 140 | Network |
| 150 | Satellite constellation |
| 200 | Display |
| 210 | Time axis |
| 220 | Current time indicator |
| 230 | Arc (solar arc) |
| 240, 250, 260 | Symbols corresponding to calendar or dynamic events |
| 310-370 | Elements of FIG. 3 |
| 410-440 | Phases of the signalling illustrated in FIG. 4 |
| 510-540 | Phases of the method of FIG. 5 |

The invention claimed is:

1. An apparatus comprising at least one processing core, at least one memory including computer program code, the at least one memory and the computer program code being configured to, with the at least one processing core, cause the apparatus at least to:

obtain at least one of a sunrise time and a sunset time for a current location of the apparatus, the current location being determined from a satellite position receiver;

obtain a plurality of calendar events occurring during a same day from a calendar application;

display a time axis on a screen, and display, relative to the time axis at parts of the time axis that are selected based on scheduled times of day of the calendar events, a plurality of symbols, the symbols corresponding to at least two of the plurality of calendar events, and display, relative to the time axis, at least one of:

an indication of sunrise corresponding to the sunrise time in connection with a part of the time axis corresponding to the sunrise time, and an indication of sunset corresponding to the sunset time in connection with a part of the time axis corresponding to the sunset time.

2. The apparatus according to claim 1, wherein at least one of the sunrise time is a time of day when the sun rises in the current location of the apparatus, and the sunset time is a time of day when the sun sets in the current location of the apparatus.

3. The apparatus according to claim 1, wherein the at least one memory and the computer program code are configured to, with the at least one processing core, cause the apparatus to obtain the at least one of the sunrise time and the sunset time, at least in part, by obtaining the current location of the apparatus from a satellite positioning receiver comprised in the apparatus.

4. The apparatus according to claim 1, wherein the at least one memory and the computer program code are configured to, with the at least one processing core, cause the apparatus to enable a user to scroll the time axis forward and backward.

5. The apparatus according to claim 1, wherein the at least one memory and the computer program code are configured to, with the at least one processing core, cause the apparatus to enable user interaction with the plurality of symbols, to thereby activate features associated with the corresponding calendar events.

6. The apparatus according to claim 1, wherein the at least one memory and the computer program code are configured to, with the at least one processing core, cause the apparatus to display a symbol in connection with a part of the time axis corresponding to a time when a user needs to start toward a predefined location so as to arrive at the predefined location before at least one of the following: sunset or adverse weather.

7. The apparatus according to claim 1, wherein the at least one memory and the computer program code are configured to, with the at least one processing core, cause the apparatus to determine a context of the apparatus, to select a subset of the plurality of calendar events based on the context of the apparatus, and to not display symbols corresponding to calendar events that are not comprised in the selected subset.

8. The apparatus according to claim 1, wherein the at least one memory and the computer program code are configured to, with the at least one processing core, cause the apparatus to predict, based at least in part on the calendar application, a need for a rich media interface and to trigger startup of a higher capability processing device in the apparatus at a time that is selected based on the prediction.

9. The apparatus according to claim 1, wherein the at least one memory and the computer program code are configured to, with the at least one processing core, cause the apparatus to display at least part of an arc, and wherein a first intersection of the arc with the time axis is the indication of sunrise and wherein a second intersection of the arc with the time axis is the indication of sunset.

10. The apparatus according to claim 1, wherein the apparatus comprises a smart watch.

11. The apparatus according to claim 1, wherein the apparatus comprises a handheld communications device.

12. The apparatus according to claim 1, wherein the apparatus comprises a personal fitness tracker.

13. The apparatus as claimed in claim 1, wherein the apparatus comprises an at least partially retractable, rotatable hardware element, and the apparatus is configured to be operable by a user by interacting with the rotatable hardware element.

14. A method comprising:

obtaining at least one of a sunrise time and a sunset time for a current location of an apparatus, the current location being determined from a satellite position receiver;

obtaining a plurality of calendar events occurring during a same day from a calendar application;

displaying a time axis on a screen, and displaying, relative to the time axis, at parts of the time axis that are selected based on scheduled times of day of the calendar events, a plurality of symbols corresponding to at least two of the plurality of calendar events, and displaying, relative to the time axis, at least one of: an indication of sunrise corresponding to the sunrise time in connection with a part of the time axis corresponding to the sunrise time, and an indication of sunset corresponding to the sunset time in connection with a part of the time axis corresponding to the sunset time.

15. The method according to claim 14, wherein at least one of the sunrise time is a time of day when the sun rises in the current location of the apparatus, and the sunset time is a time of day when the sun sets in the current location of the apparatus.

16. The method according to claim 14, wherein the at least one of the sunrise time and the sunset time is obtained, at least in part, by obtaining the current location of the apparatus from a satellite positioning receiver comprised in the apparatus.

17. The method according to claim 14, further comprising causing the apparatus to enable a user to scroll the time axis forward and backward.

18. The method according to claim 14, further comprising causing the apparatus to enable user interaction with the plurality of symbols, to thereby activate features associated with the corresponding calendar events.

19. The method according to claim 14, further comprising causing the apparatus to display a symbol in connection with a part of the time axis corresponding to a time when a user needs to start toward a predefined location so as to arrive at the predefined location before sunset and/or adverse weather.

20. A non-transitory computer readable medium having stored thereon a set of computer readable instructions that, when executed by at least one processor, cause an apparatus to at least:

obtain at least one of a sunrise time and a sunset time for a current location of the apparatus, the current location being determined from a satellite position receiver;

obtain a plurality of calendar events occurring during a same day from a calendar application;

display a time axis on a screen, and display, relative to the time axis, at parts of the time axis that are selected in based on scheduled times of day of the calendar events, a plurality of symbols corresponding to at least two of the plurality of calendar events, and display, relative to the time axis, at least one of:

an indication of sunrise corresponding to the sunrise time in connection with a part of the time axis corresponding to the sunrise time, and an indication of sunset corresponding to the sunset time in connection with a part of the time axis corresponding to the sunset time.

* * * * *